United States Patent [19]

Rice et al.

[11] 4,342,061

[45] Jul. 27, 1982

[54] VOLTAGE REDUCTION SAFETY CIRCUIT

[75] Inventors: Darrell Rice, Tulsa; Bill E. Baker, Bixby, both of Okla.

[73] Assignee: Frank W. Murphy Manufacturer, Inc., Tulsa, Okla.

[21] Appl. No.: 240,319

[22] Filed: Mar. 4, 1981

[51] Int. Cl.³ .............................................. H02H 9/00
[52] U.S. Cl. ..................................... 361/58; 123/630; 315/209 SC; 315/209 CD; 361/257
[58] Field of Search ..................... 361/58, 8, 9, 10, 2, 361/253, 257; 123/630, 631, 632, 198 D, 198 DC; 315/209 SC, 209 CD

[56] References Cited

U.S. PATENT DOCUMENTS 3,741,184 6/1973 Tanner et al. ................ 123/630 X
3,861,368 1/1975 Dogadko ...................... 123/631 X
4,034,732 7/1977 Van Burkleo ................. 123/630 X Primary Examiner—Reinhard J. Eisenzopf
Attorney, Agent, or Firm—D. Paul Weaver

[57] ABSTRACT

A circuit is presented for coupling a storage capacitor to a capacitor shorting switch whereby voltage across the shorting switch is maintained at a reduced potential relative to the storage capacitor so that the voltage and potential current at the switch contacts is maintained at levels wherein it is impossible for the release of sufficient energy into the surrounding atmosphere to cause ignition of a flammable mixture of gas and air. This is accomplished by coupling the storage capacitor to the switching device via a variable voltage divider network controlled by an SCR with a zener diode controlled gate circuit and a varistor.

7 Claims, 1 Drawing Figure

VOLTAGE REDUCTION SAFETY CIRCUIT

THE INVENTION

This invention relates to a means to isolate a shorting switch from a storage capacitor so that the voltage and current at the switch contacts will be reduced relative to the storage capacitor and maintained at a level below that which would permit release of sufficient energy into the surrounding atmosphere to cause ignition of a flammable mixture of gas and air.

BACKGROUND OF THE INVENTION

To meet National Electrical Code requirements for electrical safety in hazardous locations as outlined in NFPA-70 Article 500 and 501, the manufacturers of ignition systems for internal combustion engines have developed and are producing low hazard shielded ignition systems suitable for use in Class 1, Division 2, Group D hazard locations. These systems, under normal conditions, cannot release sufficient energy into the surrounding atmosphere to cause ignition of a flammable mixture of gas and air.

A common ignition system used in hazardous locations is a capacitor discharge ignition which includes: a mechanically driven alternator, a rectifying means, a power storage capacitor, a switching means, a step-up ignition transformer, and a spark plug with an ignition transformer and spark plug being provided for each cylinder in a multi-cylinder system.

To stop an engine equipped with a capacitor discharge ignition system, it is necessary to short out the power storage capacitor and thus prevent operation of the spark plug. A grounding terminal is normally provided so that a switch may be connected to the ignition system to shut down the engine. This grounding terminal is capable of providing sufficient energy to cause ignition of a hazardous atmosphere. Therefore, the switch, or switches, must be enclosed in an explosion proof enclosure suitable for Class 1, Division 1, Group D hazardous locations.

If the grounding circuit could be converted to a nonincendive, that is, not capable of causing ignition, the National Electrical Code allows a switch enclosed in a housing for ordinary locations to be used. This would reduce costs, space requirements, and would be safer in that it would not depend on maintenance of explosion proof enclosures for safety.

For many years, suppliers have provided control systems that operate from the voltage available at the grounding terminal of engine ignition systems. These systems consist of pressure, temperature and level operated mechanical switches and manually re-set electrically tripped indicating relays. Because some capacitor discharge ignition systems do not supply sufficient energy to reliably trip the indicating relays, an auxiliary power storage capacitor has been supplied. The output of this capacitor is, of course, ignition capable in a hazardous location and requires explosion proof enclosures which carry the same penalty as the explosion proof enclosures used for the shorting switches as previously outlined.

OBJECTIVES OF THE INVENTION

In view of the obvious penalties imposed by the need for explosion proof enclosures, it is a primary objective of the present invention to provide an electronic circuit means for coupling switches to ignition system storage capacitors or power storage capacitors whereby the voltage and current available at the switching contacts will be maintained below a point which could result in the release of sufficient energy into the surrounding atmosphere to cause ignition of a flammable mixture of gas and air.

A further objective of the present invention is to provide a controlled voltage divider network for coupling a voltage storage source to a switching means wherein the voltage divider network automatically maintains the potential across the open switching contacts at a low level relative to the voltage storage source.

Another objective of the present invention is to provide a voltage divider network including an SCR in one leg thereof which is gated on as a function of the potential in an adjacent leg as regulated by a zener diode.

The foregoing and other objectives of the invention will become apparent in light of the drawings, specification and claims contained herein.

SUMMARY OF THE INVENTION

Presented hereby is a voltage reduction safety circuit or barrier which regulates the 100 to 400 volt pulsating DC voltage present at the grounding terminal of capacitor discharge ignition systems to provide a nominal 48 volt DC which may be coupled to switching devices for shorting the grounding terminal without exceeding incendive limits. The voltage reduction safety circuit includes a storage capacitor for operating systems such as pressure, temperature and level operated mechanical switches and manually re-set electrically tripped indicating relays but the output of this storage capacitor is maintained at the nominal 48 volt DC level.

The ignition circuit input to the grounding terminal and the storage capacitor are isolated from the output of the voltage reduction safety circuit by current limiting means so that the energy level, which is a function of voltage and current, is maintained below that required to ignite a flammable mixture of gas and air in the surrounding atmosphere.

The foregoing is achieved through the use of a two leg voltage divider network wherein one leg is controlled by an SCR responsive to the potential in the other leg as controlled by a zener diode and the output of the voltage divider network is further regulated by a varistor.

DESCRIPTION OF THE DRAWING

The single drawing in this patent is a schematic diagram of a preferred embodiment of the present invention.

DESCRIPTION OF THE INVENTION

Figure 1:
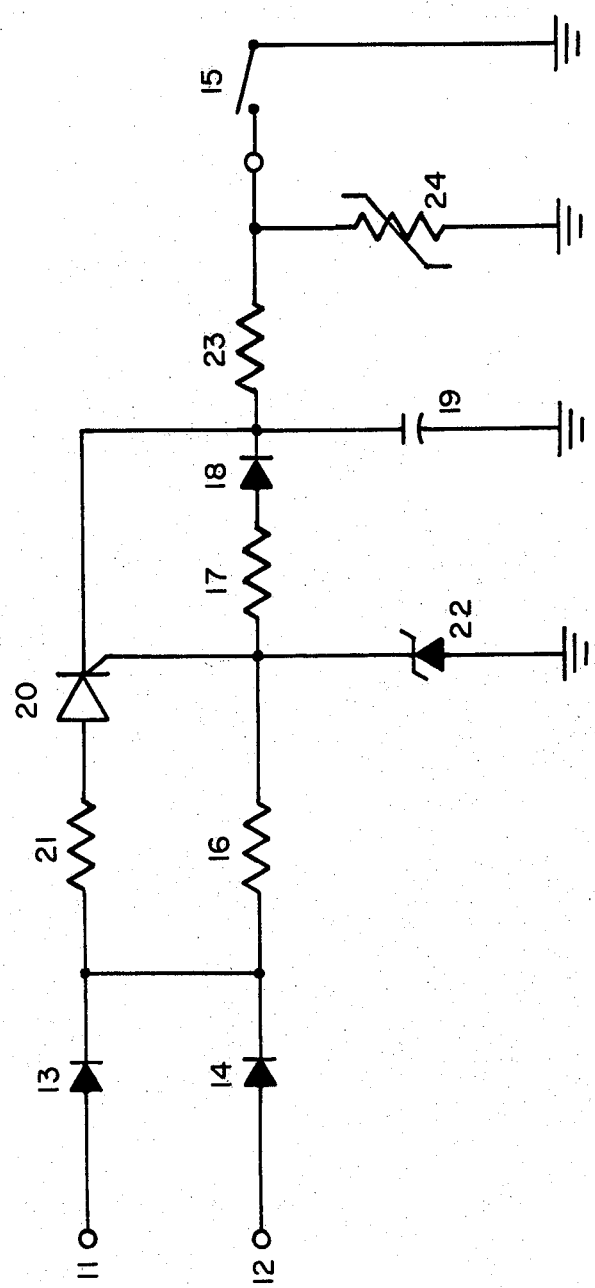

A preferred embodiment of the voltage reduction safety circuit is presented in the FIGURE which illustrates first and second connecting points 11 and 12 which, in operation, are connected to first and second grounding terminals of the associated capacitor discharge ignition system. The two terminals, 11 and 12, are presented by way of illustration only. Various manufacturers provide one or more grounding terminals on their capacitor discharge ignition systems and the present invention contemplates providing a connection for each terminal as illustrated.

Each grounding terminal, 11 and 12, is coupled to the voltage divider network by diodes connected in parallel such as the illustrated diodes 13 and 14 which provide a blocking function.

It is assumed for purposes of explanation that the capacitor discharge ignition system is a positive system and therefore the shorting terminals connected to 11 and 12 of the FIGURE would be positive terminals and the ground connections illustrated in the FIGURE are common to the capacitor discharge ignition system ground.

In the quiescent condition, switch 15 is open and current applied to terminal 11 flows through diode 13, resistor 16, resistor 17, diode 18 and capacitor 19. Current applied to terminal 12 flows through diode 14, resistor 16, resistor 17, diode 18 and capacitor 19.

When current is first applied to terminals 11 and 12, capacitor 19 is discharged and the positive plate is at ground potential. As the capacitor begins to charge, the voltage drop caused by current flow through resistor 17 and diode 18 is sufficient to forward bias the gate of SCR 20 and cause it to turn on. The conduction of SCR 20 permits current flow through resistor 21 and thus enables the voltage divider network comprised of resistors 16 and 21.

Capacitor 19 charges to a voltage level equal to a reference voltage at the gate of SCR 20 which is established by resistor 16 and zener diode 22. When the capacitor is charged to that level, current no longer flows through resistor 17 and diode 18. This results in the gate of SCR 20 being reversed bias and the SCR turns off due to insufficient forward current flow.

When the circuit reaches the quiescent state as outlined above, a small current flow exists through resistor 16 and zener diode 22 to maintain the reference voltage at the gate of SCR 20. Also, a small current flows through resistor 17 and diode 18 to capacitor 19 due to internal leakage within the capacitor. However, this current flow is not of a magnitude which would forward bias the gate of the SCR and thus it remains off.

When a load is applied to the output of the voltage reduction safety circuit by closing switch 15, current flows from capacitor 19 through current limiting resistor 23 to the load or ground. It should be understood that switch 15 is presented as a single switch for exemplary purposes only and in an actual installation, numerous switches or loads could be connected to the safety circuit and activation of any one of them would cause current flow through resistor 23.

As the voltage level on capacitor 19 begins to drop, current flow increases through resistor 17 and diode 18 to a point where the voltage drop across those components forward biases the gate of SCR 20 and it turns on. Current from the ignition grounding terminals 11 and 12 now flows through resistor 21 and SCR 20 in parallel with a circuit formed by resistors 16 and 17 and diode 18. These two legs which form the voltage divider network are coupled with the output of capacitor 19 and flow through resistor 23 and switch 15 to ground to short out the ignition system and capacitor 19. With the ignition system shorted, the engine stops and the alternator stops producing power and no further current flows through the voltage reduction safety circuit. If current is now applied to the voltage reduction safety circuit inputs 11 or 12 as may be effected by cranking the engine in an attempt to start it, the operation of the circuit is similar to that described when switch 15 was closed after the circuit had stabilized, that is SCR 20 turns on and shorts out the ignition system to prevent spark plug firing. Thus the engine cannot be started with the shut down switch 15 closed.

Varistor 24 is connected in parallel with the load devices such as switch 15 to limit the current so that the current voltage function at an open circuit load device will not exceed the incendive level. Hence the current reduction caused by this parallel circuit prevents the release of sufficient energy into the surrounding atmosphere to cause ignition of a flammable mixture of gas and air.

While a preferred embodiment of this invention has been illustrated and described, variations and modifications may be apparent to those skilled in the art. Therefore, I do not wish to be limited thereto and ask that the scope and breadth of this invention be determined from the claims which follow rather than the above description.

What I claim is:

1. A voltage reduction safety circuit, comprising:
    a voltage input means;
    a voltage divider network including first and second parallel branches coupled to said voltage input means;
    a storage capacitor electrically connected to the output of said first and second parallel branches;
    an SCR in series in said first parallel branch, said SCR including a gate electrode electrically connected to said second parallel branch;
    a gating resistor and diode connected in series in said second parallel branch and electrically positioned between said SCR gate electrode and said storage capacitor;
    a zener diode electrically connected to said SCR gate electrode for providing a reference voltage level to which said storage capacitor may charge; and
    an output circuit means electrically connected to said storage capacitor and said first and second parallel branches.

2. A voltage reduction safety circuit as defined in claim 1 further comprising a second parallel branch resistance between said SCR gate electrode and said voltage input means.

3. A voltage reduction safety circuit as defined in claim 2, further comprising a first parallel branch resistance electrically connected between said SCR and said voltage input means.

4. A voltage reduction safety circuit as defined in claim 3 wherein said output circuit means includes: an output terminal; and
    a varistor coupled between said output terminal and ground whereby said varistor will be in parallel with any load devices connected to said output terminal.

5. A voltage reduction safety circuit as defined in claim 4, wherein said output circuit means includes an output circuit resistance between said varistor and said storage capacitor.

6. A voltage reduction safety circuit as defined in claim 5 wherein said voltage input means includes: an input terminal; and
    a diode.

7. A voltage reduction safety circuit as defined in claim 5 wherein said voltage input means comprises:
    a plurality of input terminals; and
    a diode for each of said input terminals coupling said input terminals in parallel to said voltage divider network.

* * * * *